US010703900B2

(12) United States Patent
Liu et al.

(10) Patent No.: US 10,703,900 B2
(45) Date of Patent: Jul. 7, 2020

(54) TRANSESTERIFICATION OF POLYESTERS (71) Applicant: BASF SE, Ludwigshafen (DE)

(72) Inventors: Zhenguo Liu, Shanghai (CN); Siqi Xue, Suzhou (CN); Ting Liu, Shanghai (CN); Eason Sun, Shanghai (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/738,148

(22) PCT Filed: Jun. 28, 2016

(86) PCT No.: PCT/EP2016/065043
§ 371 (c)(1),
(2) Date: Dec. 20, 2017

(87) PCT Pub. No.: WO2017/001418
PCT Pub. Date: Jan. 5, 2017

(65) Prior Publication Data
US 2018/0179376 A1    Jun. 28, 2018

(30) Foreign Application Priority Data

Jul. 1, 2015    (WO) ................ PCT/CN2015/083028

(51) Int. Cl.
*C08L 67/02*    (2006.01)
*C08G 63/91*    (2006.01)
*C08K 3/013*    (2018.01)
*C08K 3/26*    (2006.01)
*C08K 7/14*    (2006.01)

(52) U.S. Cl.
CPC ............ *C08L 67/02* (2013.01); *C08G 63/916* (2013.01); *C08K 3/013* (2018.01); *C08K 3/26* (2013.01); *C08K 7/14* (2013.01)

(58) Field of Classification Search
None
See application file for complete search history.

(56) References Cited

U.S. PATENT DOCUMENTS

| 3,651,014 | A | 3/1972 | Witsiepe | |
|---|---|---|---|---|
| 3,749,696 | A * | 7/1973 | Berkau | C08G 63/83 528/275 |
| 5,496,887 | A | 3/1996 | Braune | |
| 2008/0246191 | A1* | 10/2008 | Agarwal | C08G 63/916 264/500 |
| 2013/0245205 | A1 | 9/2013 | Yamada | |
| 2014/0343244 | A1* | 11/2014 | Webb | C08G 63/87 528/182 |
| 2015/0307671 | A1 | 10/2015 | Yang et al. | |

FOREIGN PATENT DOCUMENTS

| CN | 101675108 A | 3/2010 |
|---|---|---|
| CN | 102382424 A | 3/2012 |
| CN | 102453247 A | 5/2012 |
| CN | 103228731 A | 7/2013 |
| DE | 4401055 A1 | 7/1995 |
| JP | 2795742 B2 | 9/1998 |
| WO | WO-2008-124590 A1 | 10/2008 |
| WO | WO-2014/075998 A1 | 5/2014 |

OTHER PUBLICATIONS

International Search Report for PCT Patent Application No. PCT/EP2016/065043, dated Aug. 23, 2016.

* cited by examiner

*Primary Examiner* — Robert T Butcher
(74) *Attorney, Agent, or Firm* — Marshall, Gerstein & Borun LLP (57) ABSTRACT The present invention relates to a polyester composition comprising: (A) 15 to 99 wt % of polyester blend of two or more polyesters based on the total weight of the polyester composition, (B) 0.05 to 5 wt % of a transesterification accelerator based on the total weight of the polyester composition, wherein the transesterification accelerator comprises alkali metal carbonate salt, alkali earth metal carbonate salt, alkali metal bicarbonate salt, alkali earth metal bicarbonate salt and combination thereof, (C) optionally a reinforcing filler, and (D) optionally further an additive. The present invention also relates to an article prepared from the polyester composition and a method of preparing the article.

23 Claims, 4 Drawing Sheets

TRANSESTERIFICATION OF POLYESTERS

CROSS-REFERENCE TO RELATED APPLICATIONS

This application is the U.S. National Stage application of International Patent Application No. PCT/EP2016/065043, filed Jun. 28, 2016, which claims the benefit of PCT/CN2015/083028, filed Jul. 1, 2015.

FIELD OF THE INVENTION

The present invention relates to a polyester composition, an article prepared from the polyester composition and a method of preparing the article.

DESCRIPTION OF RELATED ARTS

Polyesters such as polyethylene terephthalate (PET), polytrimethylene terephthalate (PTT) and polybutylene terephthalate (PBT) are commonly used in many industrial applications. For application, polyesters are typically formed into an article by utilizing melt forming technique such as compression, extrusion, blow molding, injection molding and the like. In order to improve the properties of the article, polyester compositions comprising two or more polyesters are commonly used in the melt forming process.

Generally, polyester blends with good transesterification have high homogeneity, and thus show improved properties, such as lower melting point, lower processing temperature, high melt flow, etc.

CN102382424A discloses a blended resin composition essentially consisting of aromatic polyester resin, polylactic acid resin and transesterification catalyst, wherein said transesterification catalyst can be selected from the group consisting of antimony acetate, cobalt acetate, manganese acetate, copper acetate, lead acetate, zinc acetate, aluminum acetate, calcium acetate, sodium acetate, magnesium acetate, titanium glycolate, titanium tetrachloride, tetramethyltitanate, potassium titanate, tetraethyltitanate, tetraisopropyltitanate, tetrabutyltitanate, titanium dioxide, stannous oxide, stannous oxalate, stannous octanoate, stannous chloride, stannous lactate, germanium dioxide, antimony trioxide and zinc oxide. It was found that the compatibility of blended resin was significantly improved by adding small amount of transesterification catalyst during the blending process without adding further compatilizer.

JP2795742 described blends of PET containing 5-15 mol % isophthalic acid and PBT at 45/55 to 55/45 weight ratios, and transesterification effects between said two polyesters during the melt blending process without additional catalysts.

CN103228731A discloses a method for producing a polybutylene terephthalate-based resin composition, which comprises melting a mixture containing a PBT resin and a polyvalent hydroxyl group-containing compound, and then adding a phosphorus compound, wherein the mixture further comprises a transesterification catalyst and the transesterification catalyst is added before the addition of the phosphorus compound. It was found that the addition of the transesterification catalyst may make it possible to sufficiently increase the fluidity of the obtained molded article when melted by single melt-kneading. The transesterification catalyst used includes titanium, tin and antimony based compounds.

However, there is still a need to find a way to promote a transesterification of polyester blends. The resulting blends can then be easily molded to manufacture end products.

SUMMARY OF THE INVENTION

For the purpose of the present invention, a polyester composition is provided, which comprises:
(A) 15 to 99 wt % of polyester blend of two or more polyesters based on the total weight of the polyester composition,
(B) 0.05 to 5 wt % of a transesterification accelerator based on the total weight of the polyester composition, wherein the transesterification accelerator comprises alkali metal carbonate salt, alkali earth metal carbonate salt, alkali metal bicarbonate salt, alkali earth metal bicarbonate salt and combination thereof,
(C) optionally a reinforcing filler, and
(D) optionally further an additive.

The present invention also provides an article prepared from said polyester composition.

In addition, the present invention relates to a method of preparing an article comprising the steps of:
(1) providing a mixture of two or more polyesters, a transesterification accelerator, and optional a reinforcing filler and optional further an additive; and
(2) compounding the mixture in an apparatus.

Surprisingly, the inventor found that alkali metal carbonate salt and alkali earth metal carbonate salt, such as sodium carbonate, lithium carbonate, potassium carbonate, calcium carbonate, and alkali metal bicarbonate salt and alkali earth metal bicarbonate salt, such as sodium bicarbonate, lithium bicarbonate, potassium bicarbonate, calcium bicarbonate, and combination thereof, can accelerate transesterification such that the compounding process for polyester blends can be carried out easily and resulting composition show good properties.

EMBODIMENTS OF THE INVENTION

In an embodiment of the present invention, a polyester composition is provided, which comprises:

(A) 15 to 99 wt % of polyester blend of two or more polyesters based on the total weight of the polyester composition, (B) 0.05 to 5 wt % of a transesterification accelerator based on the total weight of the polyester composition, wherein the transesterification accelerator comprises alkali metal carbonate salt, alkali earth metal carbonate salt, alkali metal bicarbonate salt, alkali earth metal bicarbonate salt and combination thereof, (C) optionally a reinforcing filler, and (D) optionally further an additive.

In an embodiment of the present invention, the polyester blend is present in an amount of preferably 30 to 90 wt % based on the total weight of the polyester composition.

In an embodiment of the present invention, the transesterification accelerator comprises or is selected from the group consisting of alkali metal carbonate salt, alkali earth metal carbonate salt, alkali metal bicarbonate salt, alkali earth metal bicarbonate salt and combination thereof.

In a preferred embodiment of the present invention, the transesterification accelerator comprises or is selected from the group consisting of alkali metal carbonate salt, alkali metal bicarbonate salt, and combination thereof.

In an embodiment of the present invention, the transesterification accelerator comprises or is selected from the group consisting of sodium carbonate, lithium carbonate, potassium carbonate, calcium carbonate, sodium bicarbonate, lithium bicarbonate, potassium bicarbonate, calcium bicarbonate, and combination thereof. Preferably, the transesterification accelerator comprises or is selected from the group consisting of sodium carbonate, potassium carbonate, lithium carbonate, sodium bicarbonate, potassium bicarbonate, lithium bicarbonate, and combination thereof.

In an embodiment of the present invention, the transesterification accelerator is alkali metal carbonate salt or alkali metal bicarbonate salt or their mixture.

The transesterification accelerator is preferably present in an amount of about 0.05 to 2 wt %, and more preferably of about 0.05 to 1 wt %, each based on the total weight of the polyester composition.

In an embodiment of the present invention, the polyester composition can further comprise reinforcing fillers, such as in a fibrous or particulate form. Preferably, the reinforcing filler comprises carbon fibers, glass fibers (GF), polyamide fibers, cellulose fibers, ceramic fibers, and combination thereof.

The polyester composition can further comprise an additive well known in the art, such as an additive comprising lubricant, thermal antioxidant, nucleating agent, pigment, flame retardants and combination thereof.

In an embodiment of the present invention, the content of the additive is 0.01 to 70 wt % based on the total weight of the polyester composition.

The present invention also provides an article prepared from said polyester composition.

In addition, the present invention provides a method of preparing the article comprising the steps of:

(1) providing a mixture of two or more polyesters, a transesterification accelerator, and optional a reinforcing filler and optional further an additive; and (2) compounding the mixture in an apparatus.

In an embodiment of the present invention, the method is conducted at a temperature of 150 to 350° C.

By using the transesterification accelerator above, the polyester composition has demonstrated accelerated transesterification, for example the resulting product has lower melting temperature, lower processing temperature, higher melt flowability and lower crystallinity temperature, which results in a relatively short residence time later on at injection molding to make end-user parts.

It was found that carbonate salts and bicarbonate salts are very effective to accelerate the transesterification of polyesters either filler reinforced or non-reinforced.

In one embodiment of the invention, polyester can be a thermoplastic polymer made from alkylene diol and dicarboxylic acid.

A first group of preferred polyesters is that of polyalkylene terephthalates preferably having from 2 to 10 carbon atoms in the alcohol moiety. Polyalkylene terephthalates of this type are known per se and are described in the literature. Their main chain contains an aromatic ring which derives from the aromatic dicarboxylic acid. The aromatic ring may also have substitution, e.g. halogen, such as chlorine or bromine, or C1-C4 alkyl, such as methyl, ethyl, isopropyl, n-propyl, n-butyl, isobutyl, or tert-butyl groups. These polyalkylene terephthalate may be prepared by reacting aromatic dicarboxylic acids, or their esters or other ester-forming derivatives, with aliphatic dihydroxy compounds, in a manner known per se. Preferred dicarboxylic acids which should be mentioned are 2, 6-naphthalenedicarboxylic acid, terephthalic acid and isophthalic acid, and mixtures of these.

Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids, or cyclohexanedicarboxylic acids. Among the aliphatic dihydroxy compounds, preference is given to diols having from 2 to 6 carbon atoms, in particular 1, 2-ethanediol, 1, 3-propanediol, 1, 4-butanediol, 1, 6-hexanediol, 1, 4-hexanediol, 1, 4-cyclohexanediol, 1, 4-cyclohexanedimethylanol, and neopentyl glycol, and mixtures of these. Particularly preferred polyesters are polyalkylene terephthalates which derive from alkanediols having from 2 to 6 carbon atoms. Among these, particular preference is given to polyethylene terephthalate, polytrimethylene terephthalate and polybutylene terephthalate and mixtures of these. Preference is also given to PET, PPT and PBT, which may contain up to 1 wt %, preferably up to 0.75 wt %, 1, 6-hexanediol and/or 2-methyl-1,5-pentanediol as other monomer units. The viscosity number of the polyesters is generally in the range from 50 to 220 ml/g, preferably from 80 to 160 ml/g (measured in a 0.5% strength by weight solution in a phenol/o-dichlorobenzene mixture (ratio by weight 1:1 at 25° C.) according to ISO 1628). Particular preference is given to polyesters whose carboxy end group content is up to 100 mmol/kg of polyester, preferably up to 60 mmol/kg of polyester, and in particular up to 50 mmol/kg of polyester. One way of preparing polyesters of this type is to use the process of DE-A 44 01 055. The carboxy end group content is usually determined by titration methods (e.g. potentiometry).

Another group which should be mentioned is that of fully aromatic polyesters which derive from aromatic dicarboxylic acids and from aromatic dihydroxy compounds. Suitable aromatic dicarboxylic acids are the compounds described above under the polyalkylene terephthalates. Preference is given to mixtures made from 5-100 mol % of isophthalic acid and 0-95 mol % of terephthalic acid, in particular mixtures of from about 80 to 50% of terephthalic acid and from 20 to 50% of isophthalic acid. The aromatic dihydroxy compound contains hydroxyphenyl groups. Examples are, but not limited to, 2,2-di(4-hydroxyphenyl)propane, 2,2-di(3,5-dichlorodihydroxyphenyl)propane, 1,1-di(4-hydroxyphenyl)cyclohexane, 3,4-dihydroxybenzophenone, 4,4-dihydroxydiphenylsulfone, 2,2-di(3,5-dimethyl-4-hydroxyphenyl)propane, 4,4-dihydroxydiphenyl, 2,4-di(4-hydroxyphenyl)-2-methylbutane and their mixtures.

Another group which should be mentioned is polyester block copolymers, such as copolyetheresters. Products of this type are known per se and are described for example in U.S. Pat. No. 3,651,014. Corresponding products are also available commercially, such as Hytrel®.

Preferably, the polyester comprises or is selected from the group consisting of polymethylene terephthalate, polyethylene terephthalate (PET), polytrimethylene terephthalate, polybutylene terephthalate (PBT), low melt PET copolyester and polycyclohexenedimethylene terephthalate and combination thereof. Most preferably, the polyester can be selected from low melt PET copolyester, PET, PBT and combination thereof.

PBT is commercially available material and can be used as received without further treatment. Typical melting point of the PBT is about 225° C. Preferably, the PBT is characterized by viscosity number (VN) of 80 to 170 ml/g, more preferably 90 to 150 ml/g measured in a 0.5% strength by weight solution in a phenol/o-dichlorobenzene mixture (ratio by weight 1:1 at 25° C.) according to ISO 1628.

Suitable PET derives from the aliphatic dihydroxy compound ethylene glycol and the aromatic dicarboxylic acid terephthalic acid, and up to 10 mol % of the aromatic dicarboxylic acid here may have been replaced by other aromatic dicarboxylic acids, such as 2,6-naphthalenedicarboxylic acid or isophthalic acid, or a mixture of these, or by aliphatic or cycloaliphatic dicarboxylic acids, such as adipic acid, azelaic acid, or cyclohexanedicarboxylic acid. Ethylene glycol in the polyethylene terephthalate may also have been replaced by, for example, 1,6-hexanediol and/or 5-methyl-1,5-pentanediol in amounts of up to 0.75 wt %, based on the total weight of polyethylene terephthalate used. The viscosity number of the polyethylene terephthalate of the invention is generally in the range from 40 to 120 ml/g, and preferably from 60 to 100 ml/g (determined to ISO 1628 in a 0.5% strength by weight solution in a phenol/o-dichlorobenzene mixture (1:1) at 25° C.).

Low melt PET copolyester can be commercially available material, such as the LMP products from Sinopec, and is used as received without further treatment. The low melt PET copolyester is PET containing further co-monomers, including isophthalic acid, diethylene glycol, etc. The isophthalic acid is present in an amount of 20 to 80 mol % based on the the acid portion in the low melt PET copolyester. The diethylene glycol is present in an amount of 2 to 10 mol % based on the alcohol portion in the whole low melt PET copolyester. The low melt PET copolyester has much reduced crystallinity than standard PET or PET copolymer described above. Typical melting point of the low melt PET copolyester is between 100 to 200° C. Preferably, the low melt PET copolyester is characterized by melting point of 110 to 180° C.

Polyester blend is present in an amount of preferably 30 to 90 wt % based on the total weight of the polyester composition. There can be two or more types of polyester as described above in the blend. Each polyester can make up a weight ratio of 15 to 85 wt %, more preferably 30 to 70 wt % based on the total polyester weight in the composition.

In one embodiment of the invention, fibrous or particulate fillers that may be used are for example carbon fibers, glass fibers, glass beads, amorphous silica, calcium silicate, calcium metasilicate, magnesium carbonate, kaolin, chalk, powdered quartz, mica, barium sulfate, and feldspar, and the amounts that can be used are from 0 to 70 wt %, preferably from 5 to 60 wt %, in particular from 30 to 55 wt %.

Preferred fibrous fillers that may be mentioned are carbon fibers, aramid fibers, and potassium titanate fibers, particular preference being given to glass fibers in the form of E glass with round or non-circular section. These can be used as rovings or in the commercially available forms of chopped glass.

Glass fiber is commercially available material and can be used as received without further treatment. In one preferred embodiment of the present invention, the content of the Glass fiber is preferably 5 to 60 wt %, more preferably 10 to 55 wt % based on the total weight of the polyester composition.

The fibrous fillers may have been surface-pretreated with a silane compound to improve compatibility with the thermoplastics. Preferred silane compounds are aminopropyltrimethoxysilane, aminobutyltrimethoxysilane, aminopropyltriethoxysilane and aminobutyltriethoxysilane, and also the corresponding silanes which comprise a glycidyl group.

The amounts of the silane compounds generally used for surface-coating are from 0.01 to 2 wt %, preferably from 0.025 to 1.0 wt % and in particular from 0.05 to 0.5 wt % of the filler.

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these fillers preferably being from 0.1 to 10%. Materials preferred for this purpose are boehmite, bentonite, montmorillonite, vermiculite, hectorite, and laponite. The lamellar nanofillerscan be organically modified by known methods, to give them good compatibility with the organic binder. Addition of the lamellar or acicular nano fillers to the inventive composition gives a further increase in mechanical strength.

In one preferred embodiment of the present invention, the content of the reinforcing filler is 1 to 60%, preferably 10 to 55 wt % based on the total weight of the polyester composition.

It can be appreciated by those skilled in the art that the polyester composition may further comprise other conventional additives in the art.

For example, in an embodiment of the invention, the polyester composition may further include one or more lubricant. If included, the lubricant is preferably an ester or amide of saturated aliphatic carboxylic acids having from 10 to 40 carbon atoms and saturated aliphatic alcohols or amines having from 2 to 40 carbon atoms. It is believed that when the lubricant includes fatty acid chains that are highly hydrophobic, the lubricant further aids in the hydrolysis resistance of the polyester composition and the thermoplastic polymer. A preferred lubricant is pentaerythritol tetrastearate. If included, the lubricant is preferably present in an amount of about 0.01 to 5 wt %, more preferably of about 0.01 to 3 wt %, and most preferably of about 0.01 to 2 wt %, each based on the total weight of the polyester composition.

In an embodiment of the invention, the polyester composition may include one or more antioxidant. If included, the antioxidant preferably has a sterically hindered phenolic group. Those skilled in the art appreciate that various thermal antioxidants are available to stabilize the polyester composition and the thermoplastic polymer against discoloring and to prevent thermo-oxidative degradation. In one embodiment, the thermal antioxidant is one or more material selected from the group consisting of pentaerythritoltetrakis (3-(3,5-di-tert-butyl-4-hydroxyphenyl)propionate), tetrakis (methylene-3-(3',5'-di-tert-butyl-4'-hydroxyphenyl) propionate) methane, octadecyl-3-(3',5'-d i-tert-butyl-4'-hydroxyphenyl)propionate, 1,3,5-trimethyl-2,4,6-tris(3,5-di-tert-butyl-4-hydroxybenzyl)benzene, and 4,4'-(2,2-diphenylpropyl)diphenylamine. It is also to be appreciated by those skilled in the art that various combination and mixtures of the above thermal antioxidants may also be utilized in the present invention. The preferred thermal antioxidant is pentaerythritoltetrakis(3-(3,5-di-tert-butyl-4-hydroxyphenyl)propionate). If included, the thermal antioxidant is preferably present in an amount of 0.01 to 5 wt %, more preferably of 0.01 to 3 wt %, and most preferably of 0.01 to 1.5 wt %, each based the total weight of the polyester composition.

In an embodiment of the invention, the polyester composition may include one or more nucleating agents. If included, the nucleating agent is preferably selected from at least one of, but not limited to, talc, kaolin, mica, calcium sulfate, and barium sulfate. It is to be appreciated by those skilled in the art that various combination and mixtures of the above nucleating agents may also be utilized in the present invention. If included, the nucleating agent is preferably present in an amount of about 0.01 to 2 wt %, more preferably of about 0.01 to 1 wt %, and most preferably of about 0.01 to 0.1%, each based on the total weight of the polyester composition.

In an embodiment of the invention, the polyester composition may include one or more elastomeric polymers as impact modifiers. They are generally copolymers preferably built up from at least two of the following monomers: ethylene, propylene, butadiene, isobutene, isoprene, chloroprene, vinyl acetate, styrene, acrylonitrile and (meth)acrylates. The impact modifiers are preferably present in an amount of 3 to 30 wt % based on the total weight of the polyester composition.

In an embodiment of the invention, the polyester composition may include one or more pigments. If included, the pigment may include inorganic or organic compounds and may impart a special effect and/or color to the article. The pigment may also be dispersed in a carrier matrix, such as a plastic resin, as understood by those of ordinary skill in the art. In one embodiment, the pigment is carbon black pigment. It is to be appreciated by those skilled in the art that the pigment may be any one of or combination of pigments known in the art. If included, the pigment is present in an amount of about 0.05 to 5 wt %, more preferably of about 0.5 to 3 wt %, and most preferably of about 0.5 to 1.5%, each based on the total weight of the polyester composition. The amount of the pigment includes the amount of the carrier matrix, if any. If the carrier matrix is employed, the pigment is preferably present in an amount of 10 to 50 wt % based on the total weight of the pigment and carrier matrix.

In an embodiment of the invention, the polyester composition may include one or more flame retardants. If included, the flame retardant may include bromine-, phosphorous-, nitrogen-containing compounds. The flame retardant can also be metal hydroxides. If included, the flame retardant is present in an amount of 1 to 40 wt %, preferably of 5 to 25 wt %, based on the total weight of the polyester composition.

In an embodiment of the invention, the polyester composition is obtained by blending each component in conventional means.

The above-mentioned composition may then be melted and blended and molded into the article, preferably via extrusion processes, blow molding or injection molding processes. It is to be appreciated by those skilled in the art that the present invention is not limited to one particular method of making the article.

In an embodiment of the invention, polyesters, transesterification accelerator, optional reinforcing fiber and optional additives are compounded in conventional means to form the articles as described above. One method of preparing the articles preferably comprises the steps of providing polyester, transesterification accelerator, and optional reinforcing fiber and optional additives as described above; and the step of compounding of the components, which is usually conducted at a temperature of about 150 to 350° C. It is to be appreciated by those skilled in the art that these steps may also be conducted at lower or higher temperatures. The method of the present invention may be conducted in an apparatus for example compounders, single-screw extruders, twin-screw extruders, ring extruders, melt blender, kneader, mixers, and reaction vessels and like. The preferred apparatus is a twin-screw extruder. Those of ordinary skill in the art will be able to appreciate that other apparatuses may be used.

Without wishing to be limited to a certain theory or mechanism, it is believed that transesterification occurred during compounding process to form a copolymer in order to achieve a better performance, such as lower melting point, higher melt flowability, and lower crystallinity. The transesterification reaction may continue when the material is melted in following process, such as annealing, molding, etc.

All percentages are mentioned by weight unless otherwise indicated.

The present invention is now further illustrated by reference to the following examples, however, the examples are used for the purpose of explanation and not intended to limit the scopes of the invention.

EXAMPLES

Component A/1
Polybutyleneterephthalate, Ultradur B4500 from BASF with a viscosity number of 130 ml/g (measured from a 0.005 g/ml solution in a phenol/o-dichlorobenzene (1/1) mixture at 25° C.) according to ISO1628.

Component A/2
Polybutyleneterephthalate, Ultradur B2550 from BASF with a viscosity of number 107 ml/g (measured from a 0.005 g/ml solution in a phenol/o-dichlorobenzene (1/1) mixture at 25° C.) according to ISO1628.

Component B/1

Low melt PET copolyester, LMP180 from Sinopec Shanghai Petrochemical Co., Ltd with melting point of 180±5° C. and intrinsic viscosity of 0.68 dL/g, both measured according to GB/T 14190-2008.

Component B/2

Poly(ethylene terephthalate), PET A9203 from Toray, has intrinsic viscosity of 0.65 dL/g.

Component C/1

Lubricant, Loxiol P861/3.5 from Emery Oleochemicals, pentaerythrityltetrastearate.

Component C/2

Lubricant, Luwax OA5 from BASF, oxidized polyethylene wax.

Component D

Glass fiber, T187H from Nippon Electric Glass Company with filament diameter (10.5 μm) and strand length (3 mm).

Component E/1

Black pigment, Black Pearls 880 from Cabot.

Component E/2

Black pigment, Euthylen Black 00-0305 from BASF.

Component F/1

$Na_2CO_3$, ≥99.5% in purity, sodium carbonate IPH, from Solvay chemicals.

Component F/2

$NaHCO_3$, ≥99.5% in purity, sodium bicarbonate, from Sigma-Aldrich.

Component F/3

$K_2CO_2$, 99.0% in purity, potassium carbonate, from Sinopharm Chemical Reagent Co., Ltd.

Component F/4

NaOAc (sodium acetate), ≥99.0% in purity, sodium acetate from Sinopharm Chemical Reagent Co., Ltd.

A typical process of preparing the polyester composition includes dry blending the components. The premix is then melt-extruded to form the pellets. It is to be appreciated by those skilled in the art that other processes may also be used.

DSC Measurements

DSC measurements are conducted using a Mettler Toledo DSC822e differential scanning calorimeter instrument under dry nitrogen atmosphere. Samples were heated from 0° C. to 260° C. with a heating rate of 10 K/min; held for 5 min at 260° C.; then cooled down from 260° C. to 0° C. with a cooling rate of 10 K/min; held for 5 min at 0° C. If necessary, the measurement can be repeated on the sample. In this case, Tm-1, -2, -3, etc. indicate the melting temperatures read from the heating curve in 1st, 2nd, 3rd, etc. DSC cycle. Tc-1 indicates the crystallization temperature read from the 1st cooling curve.

Gloss Measurement

Gloss measurements were conducted using a Sheen Tri-Glossmaster at 60° to measure a 60×60×2 mm plaque surface gloss according to ISO2813. At least 3 random measuring points of one plaque were chose to get the gloss value of this plaque. Total 5 plaques of each sample were measured to get the final average gloss value of this sample.

Flow Spiral Measurement

Flow spirals were measured using 2 mm thick mold at 500 bar at different testing temperatures.

Melt Flow

Melt volume flow rate (MVR) was measured at certain temperature and load according to ISO1133.

Mechanical Measurements

Tensile and charpy properties were conducted according to ISO 527-2 and ISO 179/1eU (Unnotched impact strength), ISO 179/1eA (Notched impact strength), respectively.

Nuclear Magnetic Resonance Measurements

The samples were dissolved into $CDCl_3$/TFA (v:v=3:1). 13C Nuclear Magnetic Resonance (NMR) was performed on a Bruker AVANCE III 400 NMR spectrometer operating at 400 MHz.

PBT and Low Melt PET Copolyester Blends

PBT and low melt PET copolyester blends are produced by compounding the polyester composition according to compositions listed in Table I in a conventional twin screw extruder using the standard PBT extrusion conditions, which are listed below in Table II.

TABLE I

| | Formulation (%) | | | | |
|---|---|---|---|---|---|
| | Comp Ex. 1 | Comp Ex. 2 | Example 1 | Comp Ex. 3 | Example 2 |
| A/1 | 49.2 | 24.6 | 24.5 | 34.6 | 34.4 |
| B/1 | | 24.6 | 24.4 | 34.6 | 34.4 |
| C/1 | 0.8 | 0.8 | 0.8 | | |
| C/2 | | | | 0.8 | 0.8 |
| D | 50 | 50 | 50 | 30 | 30 |
| F/1 | | | 0.3 | | 0.4 |
| Tm-1 (° C.) | 224.2 | 226.2 | 219.3 | 226.7 | 222.7 |
| Tm-2 (° C.) | 224.6 | 222.0 | 210.8 | 218.2 | 198.8 |
| Tm-3 (° C.) | 224.5 | 221.2 | 201.0 | 208.8 | 174.9 |
| Tm-4 (° C.) | 224.3 | 220.9 | 189.4 | 198.0 | 162.1 |
| Tm-5 (° C.) | 224.1 | 220.1 | 178.5 | 189.1 | 156.8 |
| Tm-6 (° C.) | 223.9 | 219.1 | 169.9 | — | — |
| Tm-7 (° C.) | 223.7 | 217.7 | 164.4 | — | — |
| Tm-8 (° C.) | 223.5 | 216.4 | 160.2 | — | — |
| Tm-9 (° C.) | 223.3 | 214.7 | 156.9 | — | — |
| Tm-10 (° C.) | 223.1 | 213.1 | 156.9 | — | — |
| Spiral flow (cm, @275° C.) | 37 | 38 | 45 | — | — |
| Spiral flow (cm, @270° C.) | — | — | — | 41 | 46 |
| Gloss (@60°) | 17 | 40 | 46 | 58 | 68 |
| MVR (cc/10 min, @250° C., 2.16 kg) | 5.5 | 5.4 | 7.8 | 6.4 | 7.6 |
| E-Modulus (MPa) | 18800 | 17300 | 19300 | 10100 | 10400 |
| Notched impact strength (kJ/m$^2$) | 11 | 11 | 19 | 8.9 | 8.1 |

TABLE II

| TZ1 (° C.) | TZ2 (° C.) | TZ3 (° C.) | TZ4 (° C.) | TZ5 (° C.) | TZ6 (° C.) | TZ7 (° C.) | TZ8 (° C.) | TZ9 (° C.) | TZ12 (° C.) | TZ13 (° C.) | Screw (rpm) |
|---|---|---|---|---|---|---|---|---|---|---|---|
| 55 | 260 | 260 | 240 | 240 | 240 | 240 | 270 | 270 | 270 | 270 | around 450 |

Notes:
TZ indicates temperature zone starting from cold feed zone.

Reduced melting point is an indication that transesterification between PBT and low melt PET copolyester occurs. With the addition of sodium carbonate, samples from Example 1 and 2 exhibited much reduced Tm along the DSC cycle test, compared with Comparison Example 1, Comparison Example 2 and Comparison Example 3, respectively. This proved that sodium carbonate accelerated the transesterification of PBT and low melt PET copolyester. In addition, the E-Modulus, MVR and spiral flow of samples from Example 1 and 2 were also better than the Comparison Examples. Sample from Example 1 also had higher surface gloss values than Comparison Example 1 and Comparison Example 2.

Figure 1:
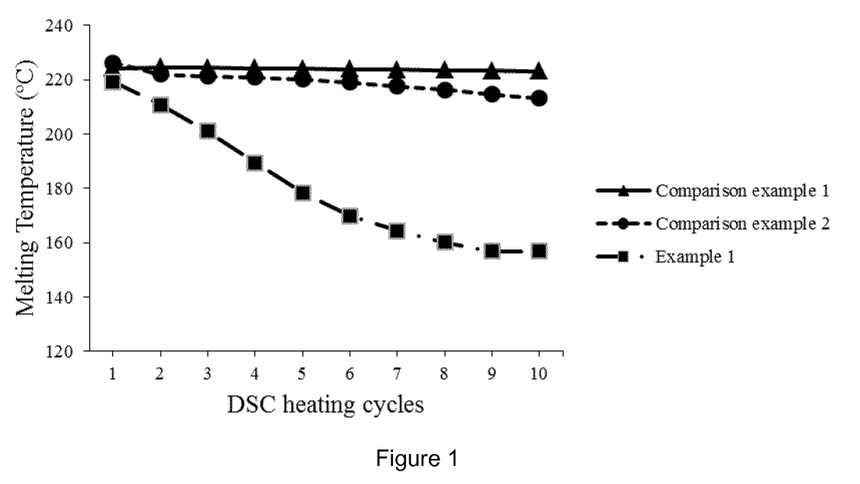
FIG. 1 shows reduced Tm of sample from the present Example 1 during the DSC cycle test compared with Comparison Example 1 and Comparison Example 2.
Figure 2:
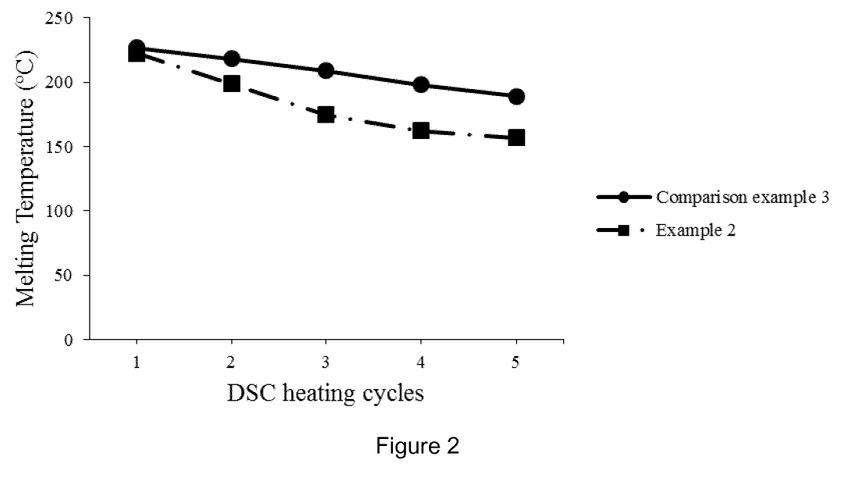
FIG. 2 shows reduced Tm of sample from the present Example 2 during the DSC cycle test compared with Comparison Example 3.
Figure 3:
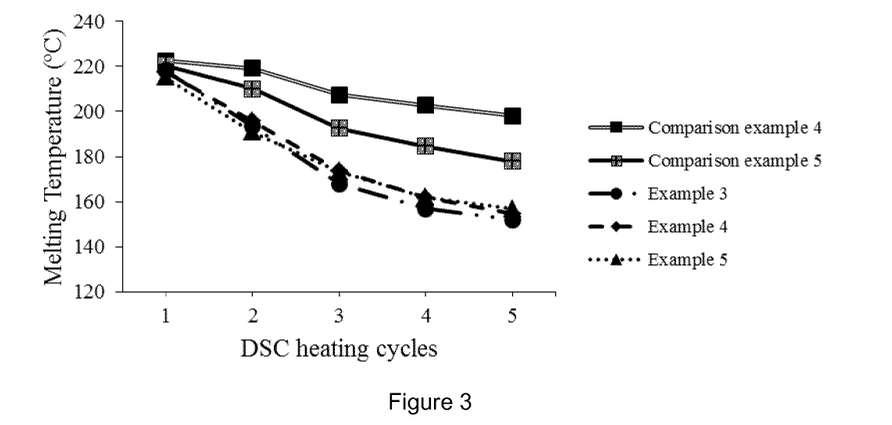
FIG. 3 shows reduced Tm of samples from the present Examples 3, 4, 5 during the DSC cycle test compared with Comparison Example 4 and Comparison Example 5.
Figure 4:
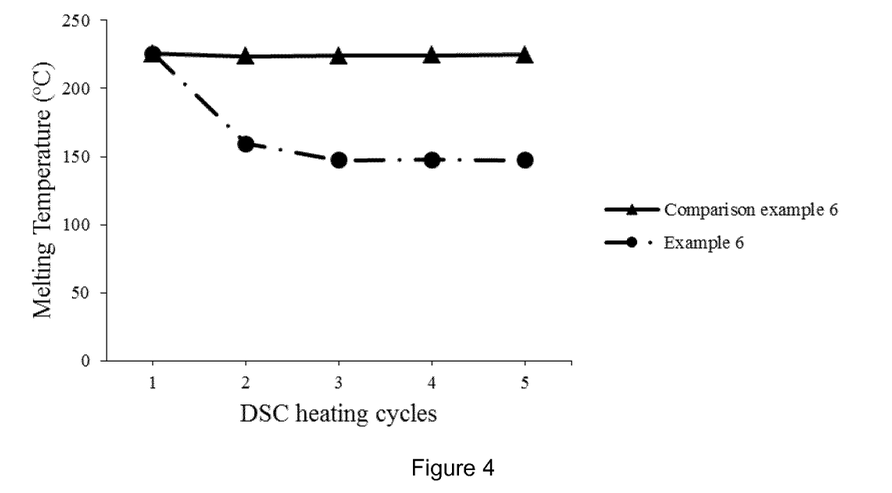
FIG. 4 shows reduced Tm of sample from the present Example 6 during the DSC cycle test compared with Comparison Example 6.
Figure 5:
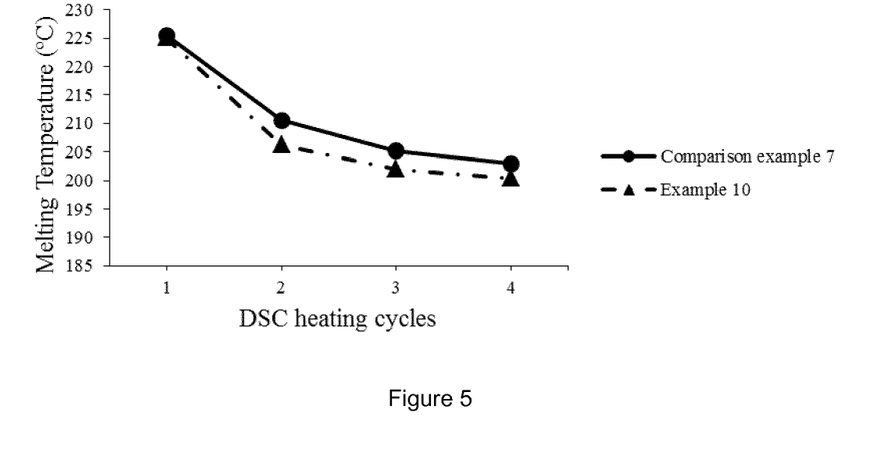
FIG. 5 shows reduced Tm of sample from the present Example 10 during the DSC cycle test compared with Comparison Example 7.
Figure 6A:
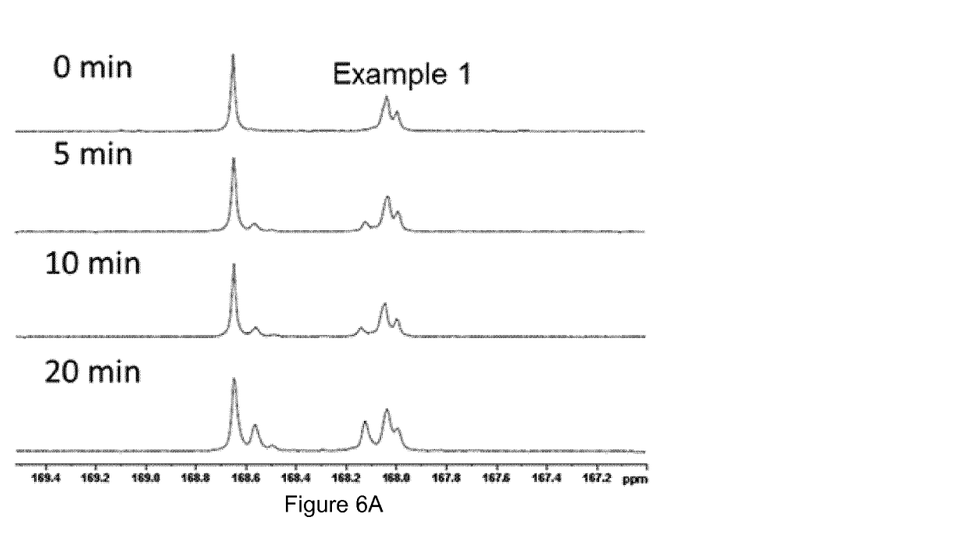
FIGS. 6A and 6B show carbonyl signals in the 13C NMR spectrum of samples from Example 1 (FIG. 6A) and Comparison Example 2 (FIG. 6B) after annealing at 260° C. for 5, 10 and 20 minutes. The chemical shifts at around 168.65 and 168.0 ppm are assigned to the carbonyl group of PBT and low melt PET copolyester, respectively, in the Example 1 and Comparison Example 2 at 0 min (as-made). After annealing at different time, the new shoulder peaks between 168.60 and 168.40 ppm and between 168.20 and 168.10 ppm indicate carbonyl group in the new molecular structure after transesterification of PBT and low melt PET copolyester.
Figure 6B:
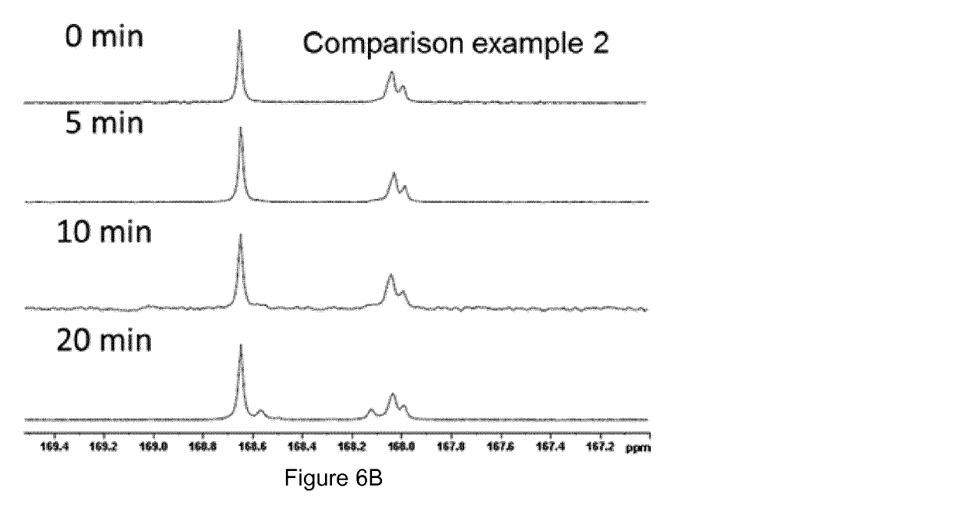
Figure 7:
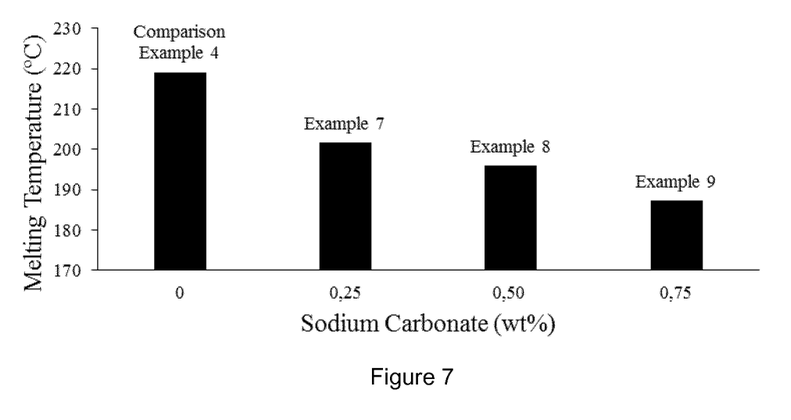
FIG. 7 shows reduced Tm-2 of samples with different loadings of sodium carbonate.

Pellets in the Example 1 and Comparison Example 2 were annealed at 260° C. under N2 for 5, 10 and 20 minutes. NMR spectrum was used to characterize the molecular structure of the untreated pellets and the annealed pellets (see FIGS. 6A and 6B). In the Example 1, shoulder peaks appeared after 5 min annealing time due to molecular structure change after the transesterification reaction between PBT and low melt PET copolyester and the shoulder peaks continued to grow along longer annealing time, as shown in FIG. 6A. In the Comparison Example, the shoulder peaks only appeared to be obvious after 20 min annealing time. It proved that sodium carbonate accelerated the transesterification in the Example 1 compared with Comparison Example 2 that does not contain sodium carbonate.

TABLE III

| | Formulation (%) | | | | |
|---|---|---|---|---|---|
| | Comp Ex. 4 | Example 3 | Example 4 | Example 5 | Comp Ex. 5 |
| Component A/1 | 21.83 | 21.7 | 21.7 | 21.7 | 21.7 |
| Component B/1 | 21.82 | 21.7 | 21.7 | 21.7 | 21.7 |
| Component C/1 | 0.15 | 0.15 | 0.15 | 0.15 | 0.15 |
| Component D | 55 | 55 | 55 | 55 | 55 |
| Component E/2 | 1.2 | 1.2 | 1.2 | 1.2 | 1.2 |
| Component F/1 | | 0.25 | | | |
| Component F/2 | | | 0.25 | | |
| Component F/3 | | | | 0.25 | |
| Component F/4 | | | | | 0.25 |
| Tm-1 (° C.) | 222.6 | 218.2 | 217.7 | 215.1 | 220.5 |
| Tm-2 (° C.) | 219.1 | 193.5 | 195.6 | 190.7 | 210.2 |
| Tm-3 (° C.) | 207.4 | 168.0 | 173.6 | 173.2 | 192.6 |
| Tm-4 (° C.) | 202.8 | 156.9 | 161.6 | 162.0 | 184.6 |
| Tm-5 (° C.) | 198.1 | 152.0 | 154.6 | 156.9 | 177.9 |
| Spiral flow (cm, @275° C.) | 35 | 42 | 43 | 47 | 54 |
| E-Modulus (MPa) | 20000 | 20700 | 20300 | 20100 | 19900 |
| Notched impact strength (kJ/m$^2$) | 9.6 | 12 | 13 | 11 | 9.8 |
| High gloss (@60°) | 33 | 28 | 49 | 34 | 5 |

These experiments in Table III were to compare the effect of various salts on accelerating transesterification of PBT and low melt PET copolyester. Example 3, 4 and 5, containing Na$_2$CO$_3$, NaHCO$_3$ and K$_2$CO$_3$ respectively, exhibited fast reduction in Tm during the DSC cycle tests, compared with Comparison Example 4 (no catalyst salt) and Comparison Example 5 where NaOAc was used. Therefore, Na$_2$CO$_3$, NaHCO$_3$ and K$_2$CO$_3$ are more effective as transesterification catalyst than NaOAc, which is stated in prior art CN102382424.

TABLE IV

| | Formulation (%) | |
|---|---|---|
| | Comp Ex. 6 | Example 6 |
| Component A/1 | 99.2 | 49.3 |
| Component B/1 | | 49.3 |
| Component C/1 | 0.8 | 0.8 |
| Component F/1 | | 0.6 |
| Tm-1 (° C.) | 225.7 | 225.7 |
| Tm-2 (° C.) | 223.8 | 159.4 |
| Tm-3 (° C.) | 224.1 | 147.3 |
| Tm-4 (° C.) | 224.5 | 147.7 |
| Tm-5 (° C.) | 224.9 | 147.3 |
| MVR (cc/10 min, 250° C., 2.16 kg) | 25.1 | 40.4 |
| E-Modulus (MPa) | 2700 | 3000 |

These experiments in Table IV were to compare the effect of sodium carbonate in PBT and low melt PET copolyester blends without glass fibers. Compared with Comparison Example 6, Example 6 containing sodium carbonate exhibited decreased Tm along the DSC heating cycles.

TABLE V

| | Formulation (%) | | | |
|---|---|---|---|---|
| | Comp Ex. 4 | Example 7 | Example 8 | Example 9 |
| Component A/1 | 21.83 | 21.55 | 21.43 | 21.3 |
| Component B/1 | 21.82 | 21.55 | 21.42 | 21.3 |
| Component C/1 | 0.15 | 0.45 | 0.45 | 0.45 |
| Component D | 55 | 55 | 55 | 55 |
| Component E/2 | 1.2 | 1.2 | 1.2 | 1.2 |
| Component F/1 | | 0.25 | 0.5 | 0.75 |
| Tm-2 (° C.) | 219.1 | 201.6 | 195.9 | 187.3 |
| Tc-1 (° C.) | 192.0 | 172.7 | 164.3 | 153.2 |
| E-Modulus (MPa) | 20000 | 21800 | 21500 | 21800 |
| Notched impact strength (kJ/m$^2$) | 9.6 | 11 | 11 | 14 |

These experiments in Table V were to compare the effect of different loadings of sodium carbonate in PBT and low melt PET copolyester blends. Compared with Comparison Example 4, Example 7, 8 and 9 exhibited decreased Tm-2 and crystallization point Tc-1. In addition, the higher loading of sodium carbonate in the blend, the lower Tc-1 and Tm-2 of the blend.

PBT and PET Blends

The PBT-PET blends are prepared in the same way as the PBT-low melt PET blends described previously. Melting point is determined by DSC. The respective result is shown in the Table VI.

TABLE VI

| | Formulation (%) | |
|---|---|---|
| | Comp Ex. 7 | Example 10 |
| A/2 | 61.99 | 61.80 |
| B/2 | 20.66 | 20.60 |
| C/2 | 0.35 | 0.35 |

TABLE VI-continued

| | Formulation (%) | |
|---|---|---|
| | Comp Ex. 7 | Example 10 |
| D | 15 | 15 |
| E/1 | 2 | 2 |
| F/1 | | 0.25 |
| Tm-1 (° C.) | 225.5 | 225.1 |
| Tm-2 (° C.) | 210.5 | 206.2 |
| Tm-3 (° C.) | 205.2 | 202.0 |
| Tm-4 (° C.) | 203.0 | 200.4 |
| Tensile Strength (MPa) | 108 | 113 |
| E-Modulus (MPa) | 6550 | 6750 |
| Unnotched impact strength (kJ/m$^2$) | 26 | 27 |
| Notched impact strength (kJ/m$^2$) | 5.2 | 5.6 |

Clearly, Example 10 (PBT-PET blend containing Na$_2$CO$_3$) exhibited lower Tm compared with Comparison Example 7 (PBT-PET blend without Na$_2$CO$_3$). This observation proves that Na$_2$CO$_3$ can promote transesterification between PBT and PET, It will be apparent to those skilled in the art that various modifications and variations can be made in the present invention without departing from the scope or spirit of the invention. Thus, it is intended that the present invention cover such modifications and variations as come within the scope of the appended claims and their equivalents.

The invention claimed is:

1. A polyester composition comprising:
   (A) 15 to 99 wt % of a polyester blend of two or more polyesters based on the total weight of the polyester composition,
   (B) 0.05 to 5 wt % of a transesterification accelerator based on the total weight of the polyester composition, wherein the transesterification accelerator is selected from the group consisting of alkali metal carbonate salt, alkali earth metal carbonate salt, alkali metal bicarbonate salt, alkali earth metal bicarbonate salt and combinations thereof,
   (C) optionally a reinforcing filler, and
   (D) optionally further an additive.

2. The polyester composition according to claim 1, wherein the transesterification accelerator is present in an amount of 0.05 to 2 wt % based on the total weight of the polyester composition.

3. The polyester composition according to claim 1, wherein the transesterification accelerator is selected from the group consisting of alkali metal carbonate salt, alkali metal bicarbonate salt, and combinations thereof.

4. The polyester composition according to claim 1, wherein the transesterification accelerator is selected from the group consisting of sodium carbonate, lithium carbonate, potassium carbonate, calcium carbonate, sodium bicarbonate, lithium bicarbonate, potassium bicarbonate, calcium bicarbonate, and combinations thereof.

5. The polyester composition according to claim 4, wherein the transesterification accelerator is selected from the group consisting of sodium carbonate, lithium carbonate, potassium carbonate, sodium bicarbonate, lithium bicarbonate, potassium bicarbonate, and combinations thereof.

6. The polyester composition according to claim 1, wherein the polyester is selected from the group consisting of polymethylene terephthalate, polyethylene terephthalate, polytrimethylene terephthalate, polybutylene terephthalate, low melt PET copolyester, polycyclohexenedimethylene terephthalate, and combinations thereof.

7. The polyester composition according to claim 1, wherein the polyester blend is present in an amount of 30 to 90 wt % based on the total weight of the polyester composition.

8. The polyester composition according to claim 1, wherein the polyester composition further comprises a reinforcing fiber.

9. The polyester composition according to claim 8, wherein the reinforcing fiber comprises glass fibers, polyamide fibers, cellulose fibers, ceramic fibers, or combinations thereof.

10. The polyester composition according to claim 8, wherein a content of the reinforcing fiber is 5 to 60 wt % based on the total weight of the polyester composition.

11. The polyester composition according to claim 1, wherein the polyester composition further comprises lubricant, thermal antioxidant, nucleating agent, pigment, flame retardants, or combinations thereof as the additive.

12. The polyester composition according to claim 11, wherein the content of the additive is 0.01 to 70 wt % based on the total weight of the polyester composition.

13. An article prepared from a polyester composition according to claim 1.

14. A method of preparing an article according to claim 13 comprising:
   providing a mixture of two or more polyesters, a transesterification accelerator, an optional a reinforcing fiber, and optional an additive; and
   compounding the mixture in an apparatus.

15. The method according to claim 14, wherein the method is conducted at a temperature of 150 to 350° C.

16. A method of transesterifying polyesters comprising the use of a bicarbonate salt as a transesterification accelerator.

17. The method according to claim 16, wherein the bicarbonate salt comprises at least one of an alkali metal bicarbonate salt or an alkali earth metal bicarbonate salt.

18. The method according to claim 17, wherein the bicarbonate salt comprises the alkali metal bicarbonate salt.

19. The method according to claim 16, wherein the bicarbonate salt comprises at least one of sodium bicarbonate, lithium bicarbonate, potassium bicarbonate, or calcium bicarbonate.

20. The method according to claim 16, wherein the bicarbonate salt comprises at least one of sodium bicarbonate, lithium bicarbonate, or potassium bicarbonate.

21. The polyester composition according to claim 2, wherein the transesterification accelerator is present in the amount of 0.05 to 1 wt % based on the total weight of the polyester composition.

22. The polyester composition according to claim 8, wherein the content of the reinforcing fiber is 10 to 55 wt % based on the total weight of the polyester composition.

23. The method according to claim 16, wherein the method comprises adding to a polyester blend of two or more polyesters 0.05 to 5 wt. % of the bicarbonate salt as the transesterification accelerator, based on the total weight of the polyester blend.

* * * * *